(12) United States Patent
Takebe et al.

(10) Patent No.: US 6,859,556 B2
(45) Date of Patent: *Feb. 22, 2005

(54) WORD RECOGNIZING APPARATUS FOR DYNAMICALLY GENERATING FEATURE AMOUNT OF WORD AND METHOD THEREOF

(75) Inventors: Hiroaki Takebe, Kanagawa (JP); Yoshinobu Hotta, Kanagawa (JP); Satoshi Naoi, Kanagawa (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/309,894

(22) Filed: May 11, 1999

(65) Prior Publication Data

US 2002/0126903 A1 Sep. 12, 2002

(30) Foreign Application Priority Data

Oct. 29, 1998 (JP) ............................................ 10-308943

(51) Int. Cl.[7] .............................. G06K 9/68; G06K 9/00; G06K 9/48; G06K 9/72
(52) U.S. Cl. ........................ 382/218; 382/187; 382/198; 382/229
(58) Field of Search ................................ 382/185, 186, 382/187, 190, 195, 197, 198, 199, 209, 215, 217, 218, 224, 229

(56) References Cited

U.S. PATENT DOCUMENTS 5,151,951 A * 9/1992 Ueda et al. .................. 382/156
5,182,777 A * 1/1993 Nakayama et al. .......... 382/170
5,675,665 A * 10/1997 Lyon ............................ 382/229
5,875,256 A * 2/1999 Brown et al. ................ 382/186
6,064,769 A * 5/2000 Nakao et al. ................ 382/224

FOREIGN PATENT DOCUMENTS

| JP | 59-177684 | 8/1984 |
|---|---|---|
| JP | 03-051982 | 3/1991 |
| JP | 08-287188 | 1/1996 |

OTHER PUBLICATIONS

Kimura et al, "Handwritten ZIP Code Recognition Using Lexicon Free Word Recognition Algorithm"; IEEE Paper ISBN: 0–8186–7128–9, pp. 906–910, 1995.*

Tsuruoka et al, "Segmentation and Recognition for Handwritten 2–Letter State Names"; IEEE Paper ISBN: 0–8186–4960–7, pp. 814–817, 1993.*

Communication and European Search Report mailed May 7, 2002.

F. Kimura, et al., "Improvements of a Lexicon Directed Algorithm for Recognition of Unconstrained Handwritten Words," Document Analysis and Recognition, Proceedings of the Second International Conference on Tsukuba Science City, Oct. 20, 1993, pp. 18–22.

(List continued on next page.)

Primary Examiner—Mehrdad Dastouri
(74) Attorney, Agent, or Firm—Staas & Halsey LLP

(57) ABSTRACT

A word recognizing apparatus extracts the feature amount from a given image, and dynamically composes the feature amount of a candidate word to be recognized which is registered in a word list, using feature amounts of characters registered in an individual character dictionary. Then, the apparatus collates the composed feature amount of the word with the feature amount extracted from the image, calculates the degree of similarity between the two feature amounts, and outputs a recognition result.

12 Claims, 17 Drawing Sheets

OTHER PUBLICATIONS

G. Kim, et al., "A Lexicon Driven Approach to Handwritten Word Recognition for Real–Time Applications," IEEE Transaction on Pattern Analysis and Machine Intelligence, vol. 19, No. 4, Apr. 1997, pp. 366–379.

M. Shridhar, et al. "Handwritten Word Recognition Using Lexicon Free and Lexicon Directed Word Recognition Algorithms,"Proceedings of the 4$^{th}$ International Conference on Document Analysis and Recognition (ICDR), Vo. II, Aug. 18, 1997, pp. 861–865.

F. Kimura et al., "Improvement of Handwritten Japanese Character Recognition Using Weighted Direction Code Histogram," Pattern Recognition, Pergamon Press Inc., vol. 30, No. 8, Aug. 1, 1997, pp. 1329–1337.

* cited by examiner

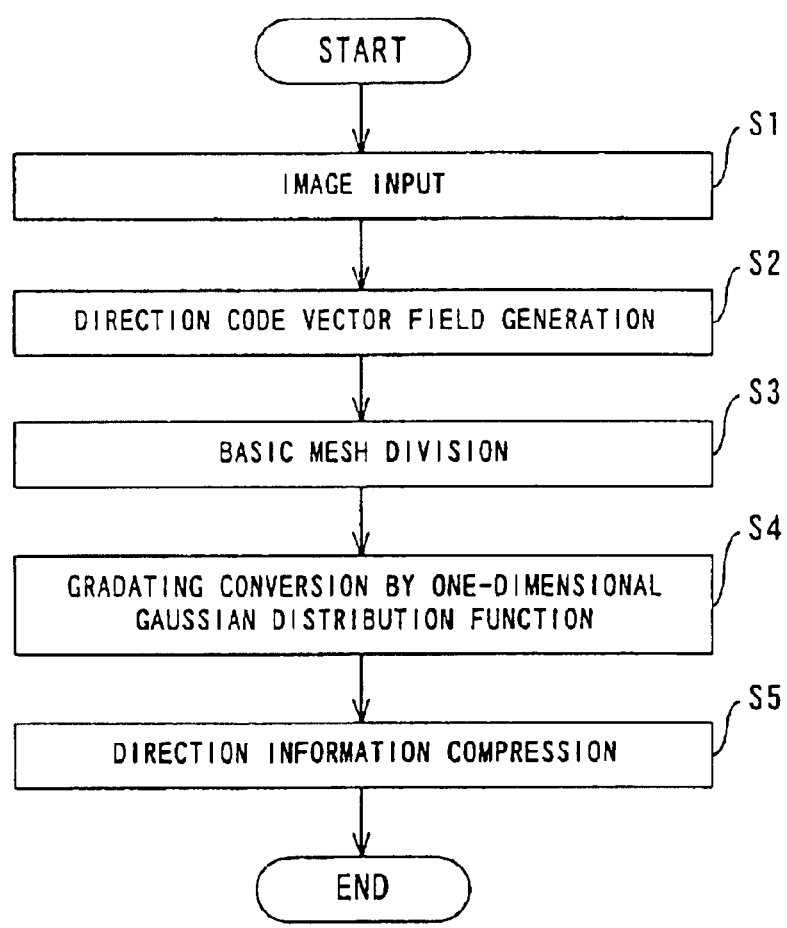
F I G. 3

| 7 | 5 | 3 |
|---|---|---|
| 9 | Ci | 1 |
| 11 | 13 | 15 |

FIG. 4

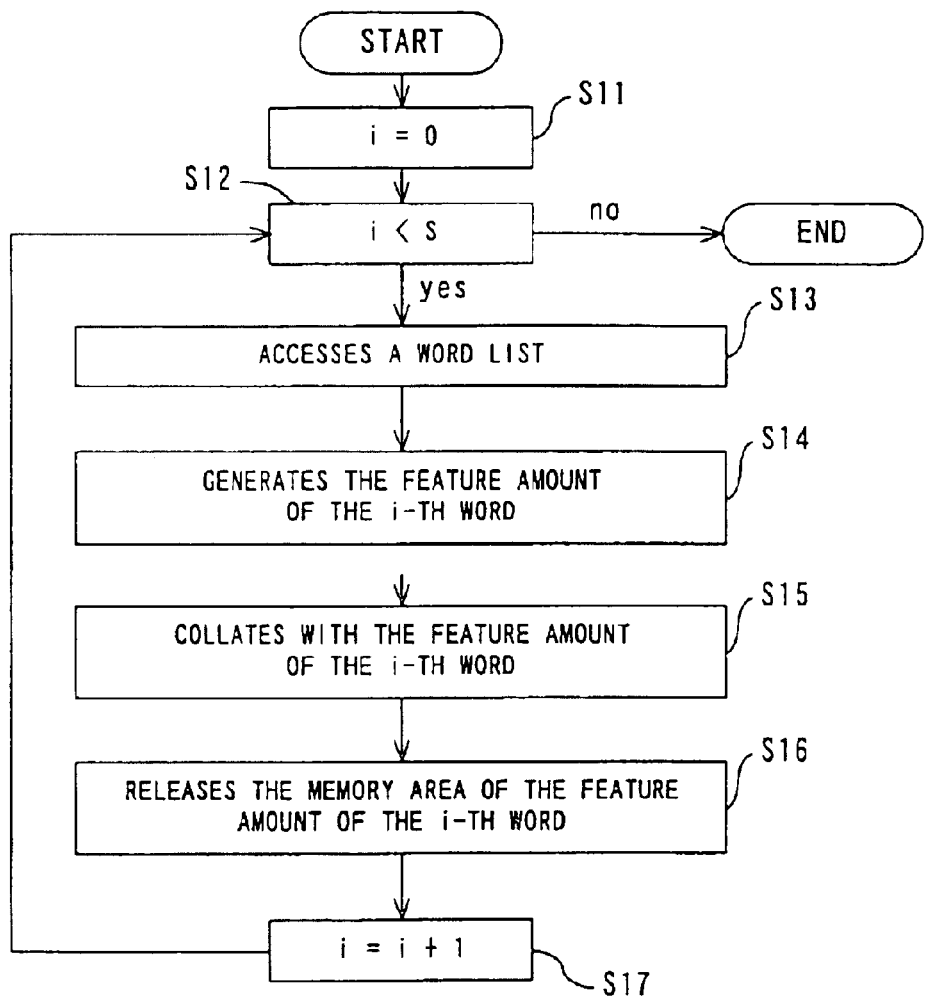
F I G. 1 1

WORD RECOGNIZING APPARATUS FOR DYNAMICALLY GENERATING FEATURE AMOUNT OF WORD AND METHOD THEREOF

BACKGROUND OF THE INVENTION

1. Field of the Invention

The present invention relates to a pattern recognizing method in which a pattern string is collectively recognized, and more particularly to a word recognizing apparatus for collectively recognizing a word and the method thereof.

2. Description of the Related Art

Conventional methods of pattern recognition are classified into the following three groups from the viewpoint of character division and extraction.

In the first method, a word is divided and extracted using its image features in units of characters, and the divided and extracted characters are individually recognized. Main image features include the blank and pitch between characters, a histogram obtained by projecting an image in the direction perpendicular to a character string, the circumscribed rectangle of the joint component of pixels, the unevenness of the upper and lower contours of an image, etc.

In the second method, a plurality of division and extraction hypotheses are developed, and each hypothesis is verified using the result of character recognition. In one case, the extraction and division hypothesis can be obtained by moving an observation window in the image, and in the other case, the extraction and division hypothesis can be obtained by using the image features described above. For verification a dynamic programming (DP) is often used to obtain complete consistency.

However, since in the case of a handwritten character string which is written with no restriction, pitch between characters is not uniform and the image features of parts to be extracted are diverse, the method has a problem in that characters cannot be divided and extracted satisfactorily. In the case where characters are searched using the observation window also, characters cannot be handled by a fixed window since pitch is not uniform. However, if the size of the window is made variable, the process time increases greatly.

Furthermore, since the image features of a part to be divided and extracted are peculiar to character types, such as kanji, hiragana, alphabets and numeric characters, the same problem also occurs in the case of a word composed of printed characters when touched characters are separated, if these different types of characters are mixed.

In the third method, a word itself is recognized without dividing the word in units of characters and extracting the characters. According to this method, although the difficult problem of character division and extraction can be avoided, this method has a problem that the number of candidates to be registered in a recognition dictionary in advance increases rapidly compared with the case where each individual character is recognized. Actually, since the size of the dictionary is restricted to a practical level due to memory capacity, only a limited number of words can be registered, and thereby its usage is restricted.

SUMMARY OF THE INVENTION

It is an object of the present invention to provide a word recognizing apparatus for collectively recognizing a word with as little restriction as possible on the recognizable scope of words.

In the first mode of the present invention, a word recognizing apparatus comprises a list unit, a dictionary unit, a generating unit and a collating unit. The list unit stores a list of one or more words, and the dictionary unit stores the feature amount of characters. The generating unit generates the feature amount of a word stored in the list unit using the feature amounts of characters stored in the dictionary unit. The collating unit collates the generated feature amount of a word with the feature amount of a recognition target, and outputs its recognition result.

In the list stored in the list unit, candidate words to be recognized as a result are registered, and in the dictionary unit, the feature amounts of individual characters composing these words are registered. The generating unit refers to the list in the list unit, extracts the feature amount of each of the characters composing a word from the dictionary unit, and composes the feature amount of the word. The collating unit collates the feature amount composed by the generating unit with the feature amount of the recognition target contained in an input image, calculates the degree of similarity between the two feature amounts, etc., and outputs it as its recognition result.

In the second mode of the present invention, a word recognizing apparatus comprises a generating unit and a collating unit. The generating unit dynamically generates the feature amount of a word using the feature amounts of its characters. The collating unit collates the generated feature amount of the word with the feature amount of a recognition target, and outputs its recognition result.

In the third mode of the present invention, a recognizing apparatus comprises a generating unit and a collating unit. The generating unit dynamically generates the feature amount of a pattern string using the feature amounts of patterns. The collating unit collates the generated feature amount of the pattern string with the feature amount of a recognition target, and outputs its recognition result.

BRIEF DESCRIPTION OF THE DRAWINGS

FIG. 3 is a flowchart showing the process of a feature extracting unit.

FIG. 4 shows the relationship between the positions of contour points and direction codes.

FIG. 11 is a flowchart showing the processes of both a feature collating unit and a feature generating unit.

DESCRIPTION OF THE PREFERRED EMBODIMENT

The detailed preferred embodiment of the present invention is described below with reference to the drawings.

Figure 1:
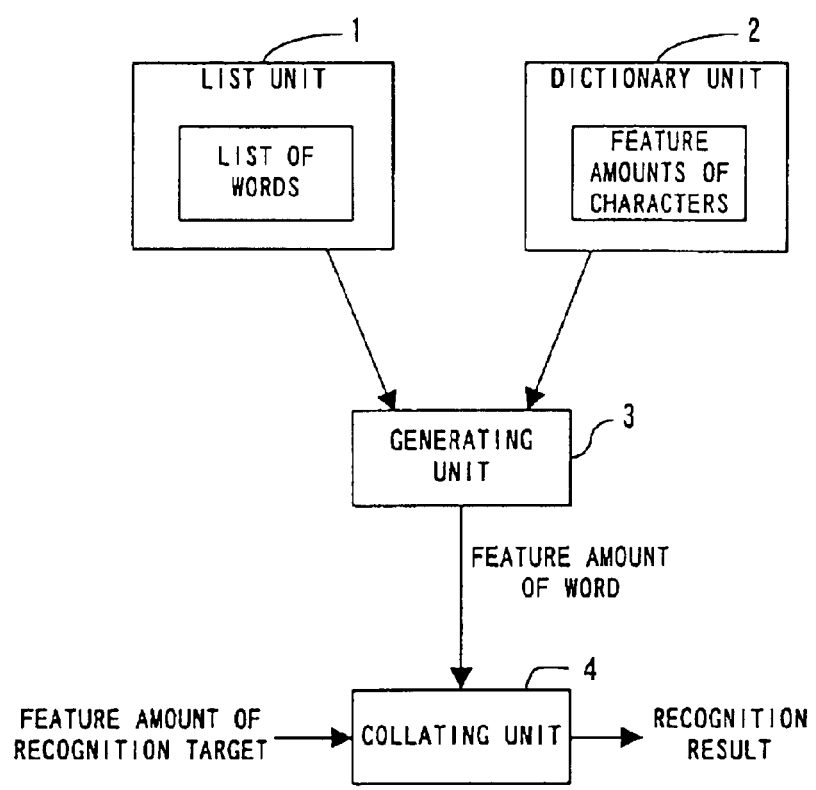
FIG. 1 shows the principle of a word recognizing apparatus of the present invention.

FIG. 1 shows the principle of a word recognizing apparatus of the present invention. A word recognizing apparatus shown in FIG. 1 comprises a list unit 1, a dictionary unit 2, a generating unit 3 and a collating unit 4.

The list unit 1 stores a list of one or more words, and the dictionary unit 2 stores feature amounts of characters. The generating unit 3 generates the feature amount of a word stored in the list unit 1 using the feature amounts of characters stored in the dictionary unit 2. The collating unit 4 collates the generated feature amount of the word with the feature amount of a recognition target, and outputs its recognition result.

In the list stored in the list unit 1, candidate words to be recognized as a result are registered, and in the dictionary unit 2, the feature amounts of individual characters composing these words are registered. The generating unit 3 refers to the list in the list unit 1, extracts the feature amount of each of the characters composing a word from the dictionary unit 2, and composes the feature amount of the word. The collating unit 4 collates the feature amount composed by the generating unit 3 with the feature amount of the recognition target contained in an input image, calculates the degree of similarity, etc., between the two feature amounts, and outputs it as its recognition result.

In this way, by dynamically generating the feature amounts of only candidate words in the course of a recognizing process, and not by preparing in advance a word dictionary in which there are the feature amounts of many words, the amount of memory to be used can be reduced. Since there is no need to register the feature amounts of words in the list, many words can be registered in the list, and thereby the feature amounts of these words can be generated on occasion. For this reason, the scope of words can not be restricted as in a conventional word dictionary.

For example, the list unit 1, the dictionary unit 2, the generating unit 3 and the collating unit 4 shown in FIG. 1 correspond to a word list 14, an individual character dictionary 15, a feature generating unit 13 and a feature collating unit 12, respectively, shown in FIG. 2 and described later.

In the following descriptions, a case where character strings contained in an image to be recognized are horizontal is assumed in order to simplify the descriptions. Characters are horizontally connected, and words are also written horizontally. However, the present invention can also be applied to a case where character strings are vertical and characters are vertically connected.

The word recognizing apparatus in this embodiment dynamically generates a word dictionary from a dictionary of individual characters, and collectively recognizes a word. A key point in realizing such a word recognizing apparatus is to determine the feature amounts and a method of composing them in such a way that the feature amount obtained from a word image may match the composed feature amount of each of the characters composing the word.

In the individual character dictionary, the feature amounts of individual characters are registered, and by mixing feature amounts of individual characters, the feature amount of a corresponding word is generated. It is assumed here that a word X (="AB") is composed of characters A and B, the images of characters A and B and the word X are images a, b and x, respectively, and the feature amounts obtained from those images are $\alpha$, $\beta$ and $\chi$, respectively.

At this time, in order to generate the feature amount of a word from the feature amounts of its individual characters, a composition operation f has to be defined between two feature amounts, and $\chi = f(\alpha, \beta)$ has to hold true. That such a condition holds true is assumed to mean that operation f is commutative for the ordinary composition of an image.

The feature amount of characters and words conventionally used is gradated in order to avoid the shift and deformation of characters. In the gradating process, an image is divided by a predetermined number of meshes, and a direction code histogram in each of the small obtained areas is weighted and added to that of a small area surrounding it. Since by this gradating process, information relating to the small surrounding areas is introduced into a small area, the shift of characters and deformation of their styles can be absorbed.

However, if such a gradating process is applied to a word, the direction code histogram of one character is weighted and added to that of the other on the boundary of two characters, and a commutative composition operation f is not easily found.

Under these circumstances, in this embodiment a conventional gradating process using Gaussian distribution, etc., is applied to the vertical direction which is perpendicular to the connecting direction of characters, but no gradation is applied to the horizontal direction which is the connecting direction of characters. In this way, the feature amount is generated.

If the feature amount is applied to a word written horizontally, the direction code histogram of one character is not weighted and added to that of the other on the boundary between two characters, and a commutative composition operation f is easily obtained by simply arranging two feature amounts of characters. However, in this situation the shift and deformation of characters are not taken into consideration. Therefore, when a distance between an image and a candidate to be recognized is calculated, its recognition accuracy is arranged to be improved using DP matching.

The conventional feature amount of a character can be obtained by dividing an image by a predetermined number of meshes. If this mesh-division is applied to a word with a plurality of characters, the more characters are contained in the word, the larger the meshes become. For this reason, if the resolution of the meshes becomes relatively low, the recognition accuracy will be affected.

Therefore, in this embodiment the number of meshes is changed according to the length of a word. Since in the case of a word horizontally written the vertical length of an image is fixed even if the number of characters increases, the vertical length of the image is divided by a predetermined number and the obtained quotient is designated as the size of a basic mesh. Mesh-division is performed horizontally and vertically based on the size. In this case, the number of horizontal meshes varies depending on the horizontal length of the image. However, since DP matching is used in the calculation of the distance, uncertainty due to the change in the number of meshes is absorbed.

The description on the feature amount of a word vertically written can be obtained by replacing the word "horizontal" with the word "vertical" in the above description on the feature amount of a word written horizontally.

Figure 2:
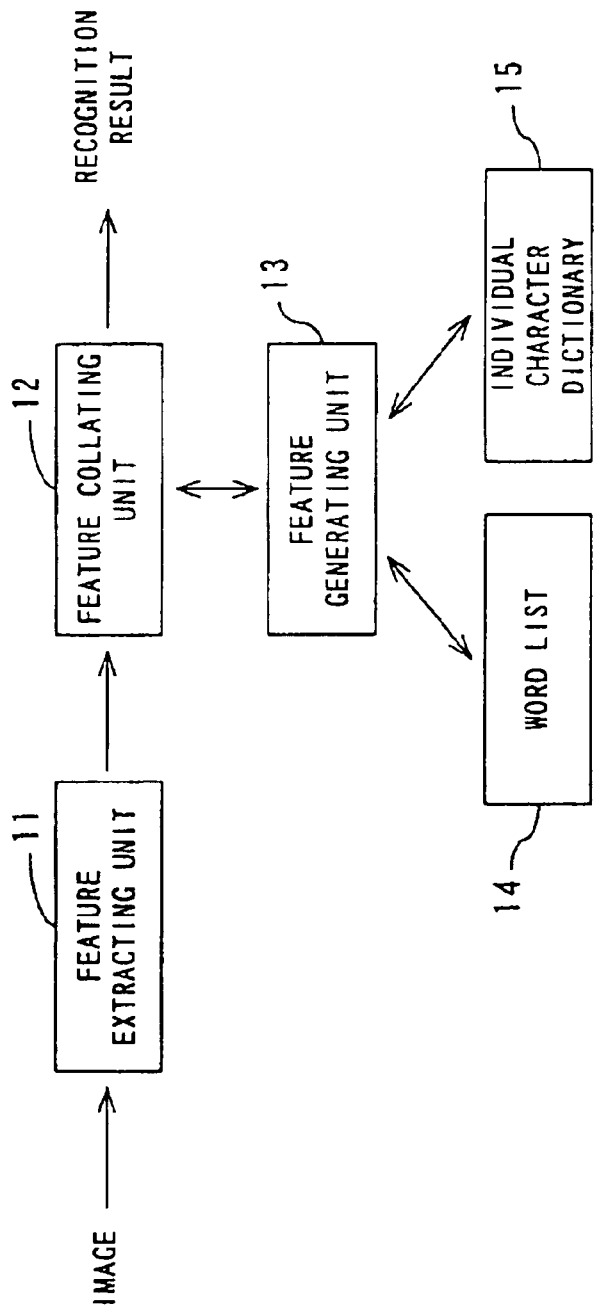
FIG. 2 shows the configuration of a word recognizing apparatus.

FIG. 2 shows the configuration of the word recognizing apparatus of this embodiment. The word recognizing apparatus shown in FIG. 2 comprises a feature extracting unit 11, a feature collating unit 12, a feature generating unit 13, a word list 14 and an individual character dictionary 15.

The feature extracting unit 11 extracts the feature amount from a given image, and the feature generating unit 13 composes the feature amount of a candidate word to be recognized, and is stored in the word list 14. The feature collating unit 12 collates the feature amount extracted by the feature extracting unit 11 with the feature amount of a word generated by the feature generating unit 13 using the feature amounts of words generated by the feature generating unit 13 as a word dictionary, and outputs a word that has the closest feature amount as the first candidate of the recognition result.

At this time, although it is desirable for the word list 14 to contain the word indicated by an image to be recognized, the process often become complicated if there are too many words. Therefore, several word lists 14 are prepared in advance, the feature generating unit 13 estimates a word list 14 with a high possibility of containing a word to be recognized according to the previous recognition result, and uses it.

For example, when the image of an address in a letter written in Japanese is processed, it is judged that there is a high possibility that a name of a city, town or village will appear if the immediately preceding recognition result was a name of a prefecture such as "Tokyo" or "Hokkaido", and thus a word list 14 containing names of cities, towns and villages is selected, and the feature amount of a word is composed.

Next, the process of the feature extracting unit 11 is described with reference to FIGS. 3 to 9. FIG. 3 is a flowchart showing the process of the feature extracting unit 11. This is a process obtained by adding a new part to a process described in a paper, Shinji Tsuruoka et al., "Handwritten "KANJI" and "HIRAGANA" Character Recognition Using Weighted Direction Index Histogram Method," Journal of the Institute of Electronic Information and Communication (D), Vol. J70-D, No. 7, pp. 1390–1397, July 1987.

The feature extracting unit 11 first inputs an image to be recognized (step S1), and generates a direction code vector field (step S2). Then, the unit 11 performs the basic mesh-division of the image and generates a direction code histogram vector field (step S3), and performs a vertical gradating conversion using a one-dimensional Gaussian distribution function (step S4). Then, the unit 11 compresses the vector of the direction code histogram vector field (step S5), extracts the feature amount, and terminates the process.

In step S2, the feature extracting unit 11 first performs the eight-connection contour trace of the input image, and designates the obtained contour point series result as $\{C_i\}$. Here, $C_i$ corresponds to a pixel on the contour of a pattern contained in the image. Then, the unit 11 determines a direction code $d_i$ with eight directions on the contour point $C_i$, based on the position of the contour point $C_{i+1}$ subsequent to it.

Figure 4:
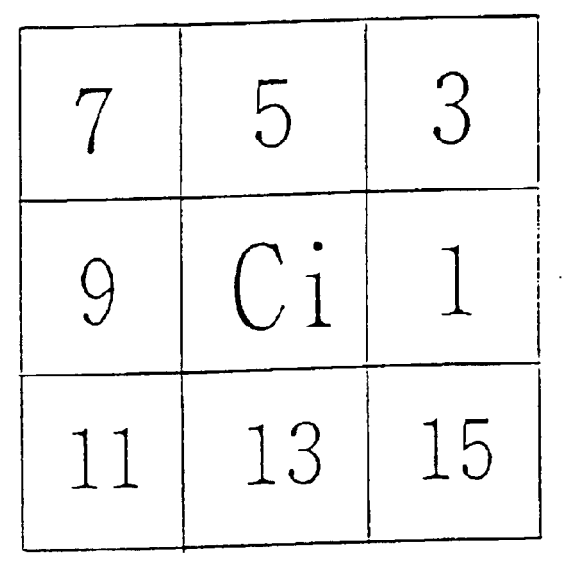

FIG. 4 shows the relationship between the position of contour point $C_{i+1}$ with contour point $C_i$ as a center and a direction code. For example, $C_{i+1}$ is positioned on the right of $C_i$ ($d_i=1$), $C_{i+1}$ is positioned on the upper right of $C_i$ ($d_i=3$), and $C_{i+1}$ is positioned above $C_i$ ($d_i=5$).

Figure 5:
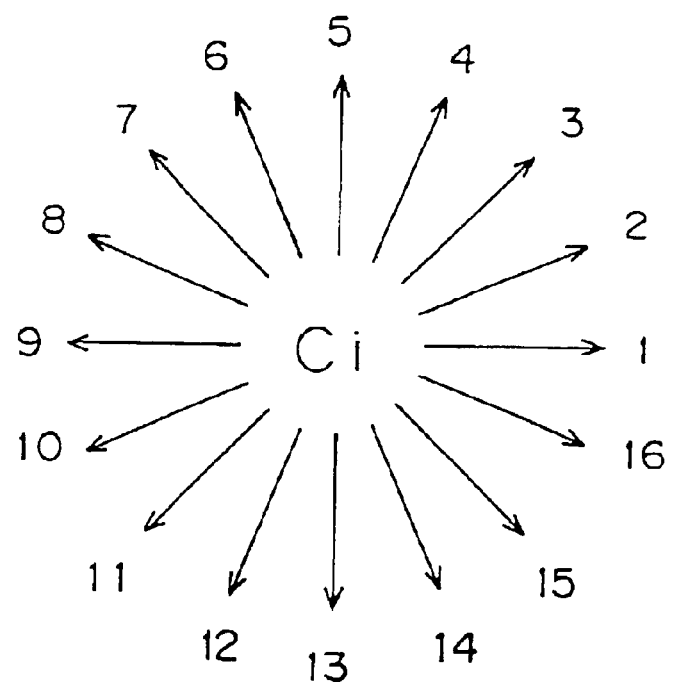
FIG. 5 shows 16 direction codes.

Then, by averaging a direction code $d_i$ at $C_i$ and a direction code $d_{i-1}$ at a contour point $C_{i-1}$ immediately preceding $C_i$, a direction code $D_i$ with 16 directions at $C_i$, as shown in FIG. 5, can be obtained.

Figure 6:
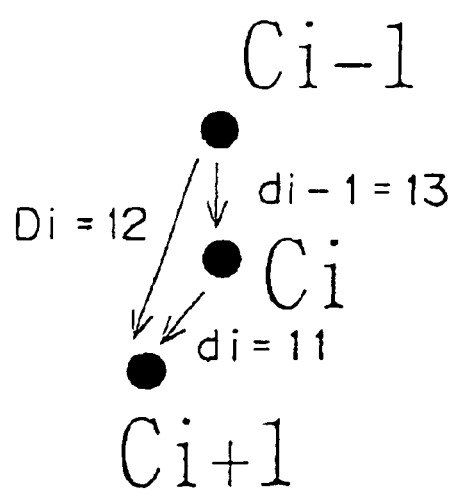
FIG. 6 shows how to determine 16 direction codes.

For example, if contour points $C_{i-1}$, $C_i$ and $C_{i+1}$ are positioned as shown in FIG. 6, $d_{i-1}=13$ since $C_i$ is positioned under $C_{i-1}$, and $d_i=11$ since $C_{i+1}$ is positioned at the lower left of $C_i$. Therefore, the direction code with 16 directions $D_i=((d_i-1)+d_i)/2=12$. This direction code indicates an intermediate direction between the direction of a direction code 13 and that of a direction code 11. Generally speaking, if a direction code $D_i$ is an odd number, it indicates one of eight directions, as shown in FIG. 4, and if it is an even number, it indicates an intermediate direction between two adjacent directions.

Then, a 16-value vector is allocated to the points (pixels) of an image. Here, a 0 vector with all of the 16 elements set to 0 is allocated to points other than contour points. As for the contour point $C_i$, a vector with the $D_i$-th element set to 1 and other elements set to 0 is allocated. The vector field consisting of these 16-value vectors is called a direction code vector field.

For example, the direction code vector at a contour point $C_i$ shown in FIG. 6 is as follows.

(0, 0, 0, 0, 0, 0, 0, 0, 0, 0, 0, 1, 0, 0, 0, 0)

In step S3, the feature extracting unit 11 first divides the vertical length y of an image by a predetermined integer M, and designates the quotient L as the size of a basic mesh. Then, the unit 11 designates the quotient obtained by dividing the horizontal length X of the image by L, as n, and divides the entire image by M×n pieces of mesh. According to such a mesh-division, the number of meshes varies depending on the horizontal length, and meshes with a constant size can be obtained.

Then, in each of the obtained meshes a histogram with a direction code $D_i$ is drawn up, provided however, that all the weight coefficients of the histogram are 1. This histogram is generated by adding the direction code vectors of points contained in the mesh, and is indicated by a 16-value vector. Then, it is assumed that this is called a direction code histogram vector, and a vector field consisting of direction code histogram vectors of all meshes is called a direction code histogram vector field. For example, from the following four direction code vectors, (1, 0, 0, 0, 0, 0, 0, 0, 0, 0, 0, 0, 0, 0, 0, 0)
(0, 0, 0, 0, 0, 0, 0, 0, 0, 0, 0, 1, 0, 0, 0, 0)
(0, 0, 0, 0, 0, 0, 0, 0, 0, 0, 0, 1, 0, 0, 0, 0)
(0, 0, 0, 0, 0, 0, 0, 0, 0, 0, 0, 1, 0, 0, 0, 0)

the following direction code histogram vector is obtained.

(1, 0, 0, 0, 0, 0, 0, 0, 0, 0, 0, 3, 0, 0, 0, 0)

Figure 7:
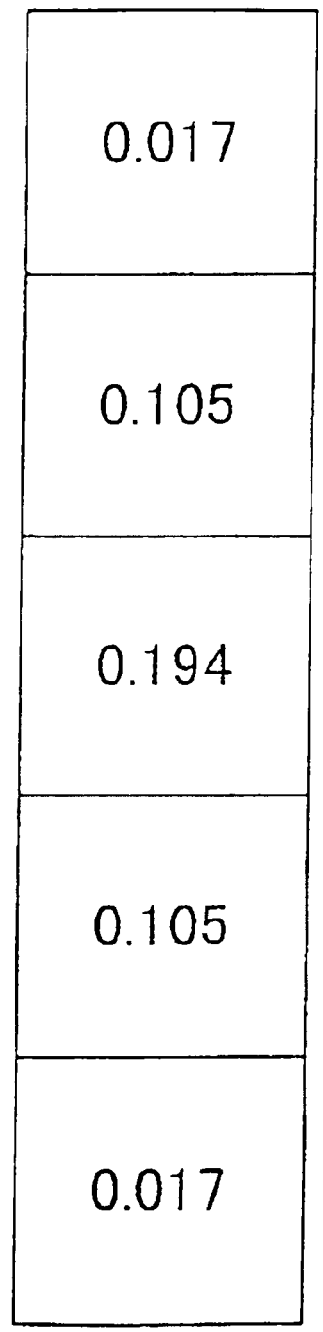
FIG. 7 shows a one-dimensional Gaussian distribution type filter.

In step S4, the feature extracting unit 11 performs only a vertical gradating conversion using a one-dimensional Gaussian distribution function. Here, for example, a one-dimensional Gaussian distribution type filter consisting of five weights, as shown in FIG. 7, is generated and is applied to the direction code histogram vectors of five meshes arranged vertically.

Thus, the elements of five direction code histogram vectors are weighted and added according to a Gaussian distribution to generate a new direction code histogram vector. Then, the direction code histogram vector of a mesh positioned in the center is updated by the generated direction code histogram vector.

In this way, by performing only a vertical gradating conversion using a one-dimensional Gaussian distribution type filter, the vertical shift and deformation of characters can be absorbed. As to the horizontal direction which is the connecting direction of characters, direction code histogram vectors are not weighted and added, and the feature amounts are not mixed on the boundary between two characters. Therefore, the commutative composition operation f described above can be easily defined as described later.

Here, if an integer m, such that m<M, is determined in advance and m pieces of mesh are selected as the center positions of the filter out of M pieces of vertical mesh, an M×n direction code histogram vector field can be space-information-compressed into an m×n direction code histogram vector field.

Figure 8:
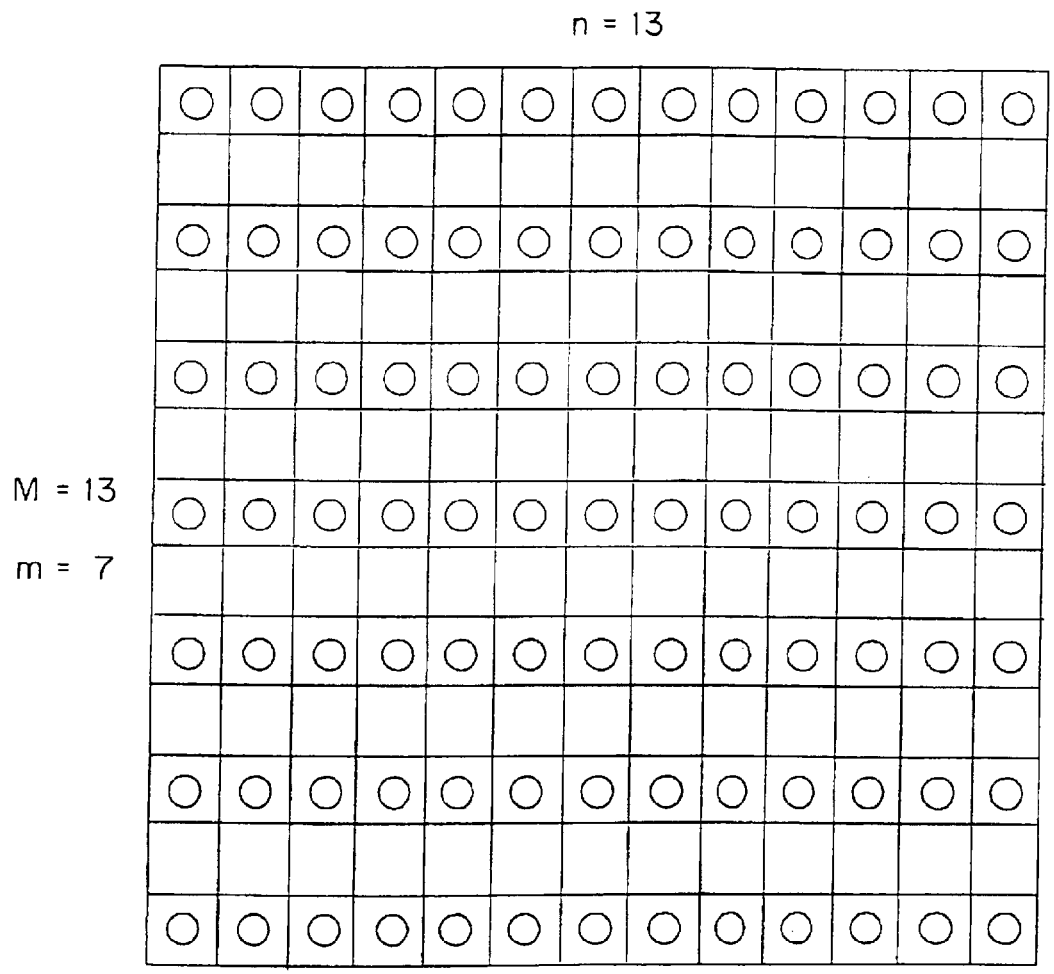
FIG. 8 shows a basic mesh division and the center position of a mask.

For example, when M=13 and n=13, the image is divided into 13×13 meshes as shown in FIG. 8. Here, if m=7 and meshes marked by 0 are selected as the center positions of the filter, the 13×13 direction index histogram vector field is space-information-compressed into a 7×13 direction code histogram vector field.

In step S5, the feature extracting unit 11 direction-compresses the vector of a direction code histogram vector field. First, the unit 11 multiplies the values of two elements immediately preceding and following each of the elements corresponding to direction codes 1, 3, 5, 7, 9, 11, 13 and 15 out of the 16 elements of the direction code histogram vector by 0.5, and adds two multiplication results to the value of the element between them. Then, the unit 11 compresses the 16-value vector into an eight-value vector by deleting elements corresponding to direction codes 2, 4, 6, 8, 10, 12, 14 and 16. The remaining eight elements correspond to the eight directions shown in FIG. 4.

Then, the unit 11 handles all two-element sets of opposite directions out of the eight vector elements as one element, and adds the values of elements corresponding to the direction codes 9, 11, 13 and 15 to the values of elements corresponding to direction codes 1, 3, 5 and 7, respectively. Thus, an eight-value vector is compressed into a four-value vector. Accordingly, a direction code histogram vector field consisting of m×n pieces of four-value vector can be obtained.

Here, if n pieces of a four-value vector horizontally arranged are taken as a direction code histogram series, m pieces of a direction code histogram series are to be obtained. The feature extracting unit 11 outputs these m pieces of a direction code histogram series as the feature amount of the image.

Figure 9:
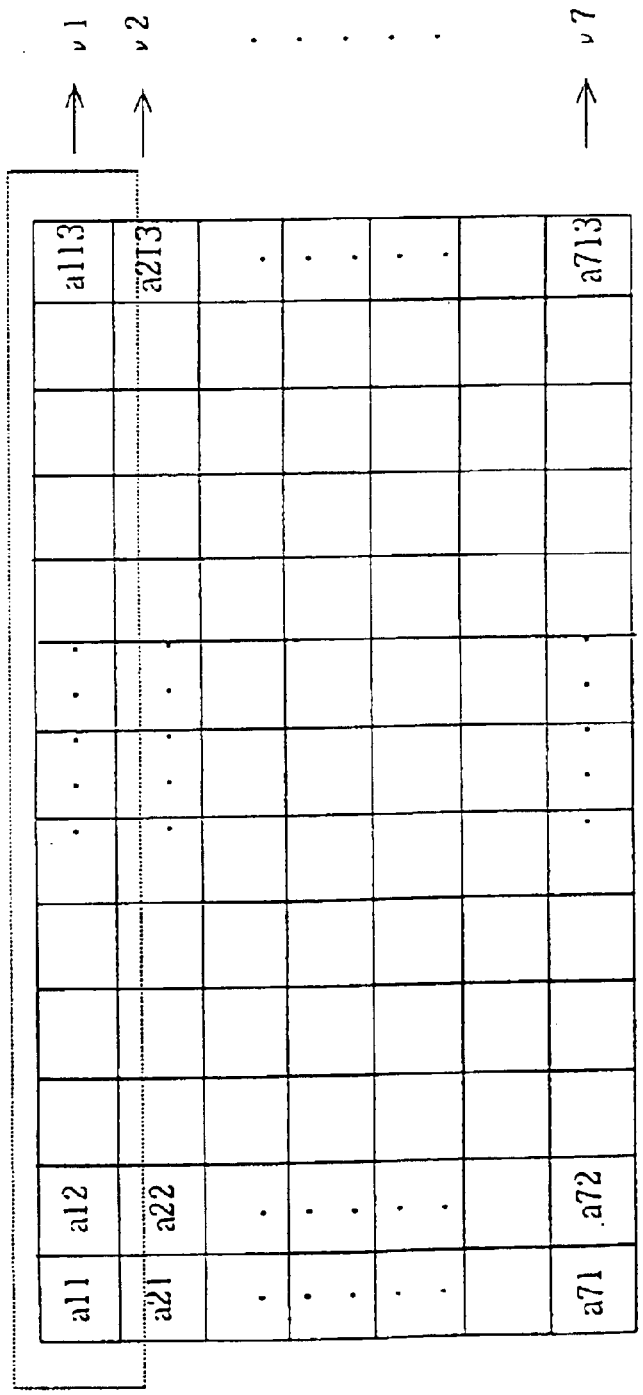
FIG. 9 shows a direction code histogram series.

For example, if a direction code histogram vector is generated based on the space information compression as shown in FIG. 8, 7 pieces of a direction code histogram series, as shown in FIG. 9, can be obtained. In FIG. 9, aij (i=1, 2, ..., 7, j=1, 2, ..., 13) indicates a four-value vector, and vi (i=1, 2, ..., 7) indicates a direction code histogram series.

Next, the word dictionary generating process of the feature generating unit 13 is described. It is assumed here that I pieces of word lists δ1, δ2, ..., δI are prepared as the word list 14 and the i-th word list δi contains only the IDs of words and the IDs of characters composing the words. However, the IDs of characters are also registered in the individual character dictionary 15 and are referenced when the feature amount of the word is generated.

When the word list δi to be processed is designated by the feature collating unit 12, the feature generating unit 13 refers to the individual character dictionary 15 for each word contained in it, based on the IDs of its component characters, and generates the feature amount of the word.

It is assumed here that a word w is composed of characters c1, c2, ..., cK and the feature amount of the i-th character ci is $\Lambda i$. The feature amount of each character is generated in advance by the same process as described above for the extraction of the feature amount, and is stored in the individual character dictionary 15 together with its ID. At this time, the feature amount $\Lambda w$ of the word w is defined using $\Lambda w = \Sigma \Lambda i$ where $\Sigma \Lambda i$ indicates the sum of K feature amounts $\Lambda 1, \Lambda 2, \ldots, \Lambda K$, and the sum $\Lambda 1 + \Lambda 2$ of two feature amounts $\Lambda 1$ and $\Lambda 2$ is defined by the following composition operation.

It is assumed here that $\Lambda 1 = (\lambda 11, \lambda 12, \ldots, \lambda 1m)$ and $\Lambda 2 = (\lambda 21, \lambda 22, \ldots, \lambda 2m)$ using m pieces of direction code histogram series $\lambda 1i$ and $\lambda 2i$ (i=1, 2, ..., m). At this time, $\Lambda 1 + \Lambda 2 = (\lambda 11 \lambda 21, \lambda 12 \lambda 22, \ldots, \lambda 1m \lambda 2m)$ using m pieces of direction histogram series $\lambda 1i \lambda 2i$.

Here, $\lambda 1i \lambda 2i$ indicates a new direction code histogram series generated by arranging the direction code histogram series $\lambda 2i$ after the direction code histogram series $\lambda 1i$ as it is. If each of $\lambda 1i$ and $\lambda 2i$ consists of n pieces of a four-value vector, $\lambda 1i \lambda 2i$ consists of 2n pieces of a four-value vector.

Figure 10:
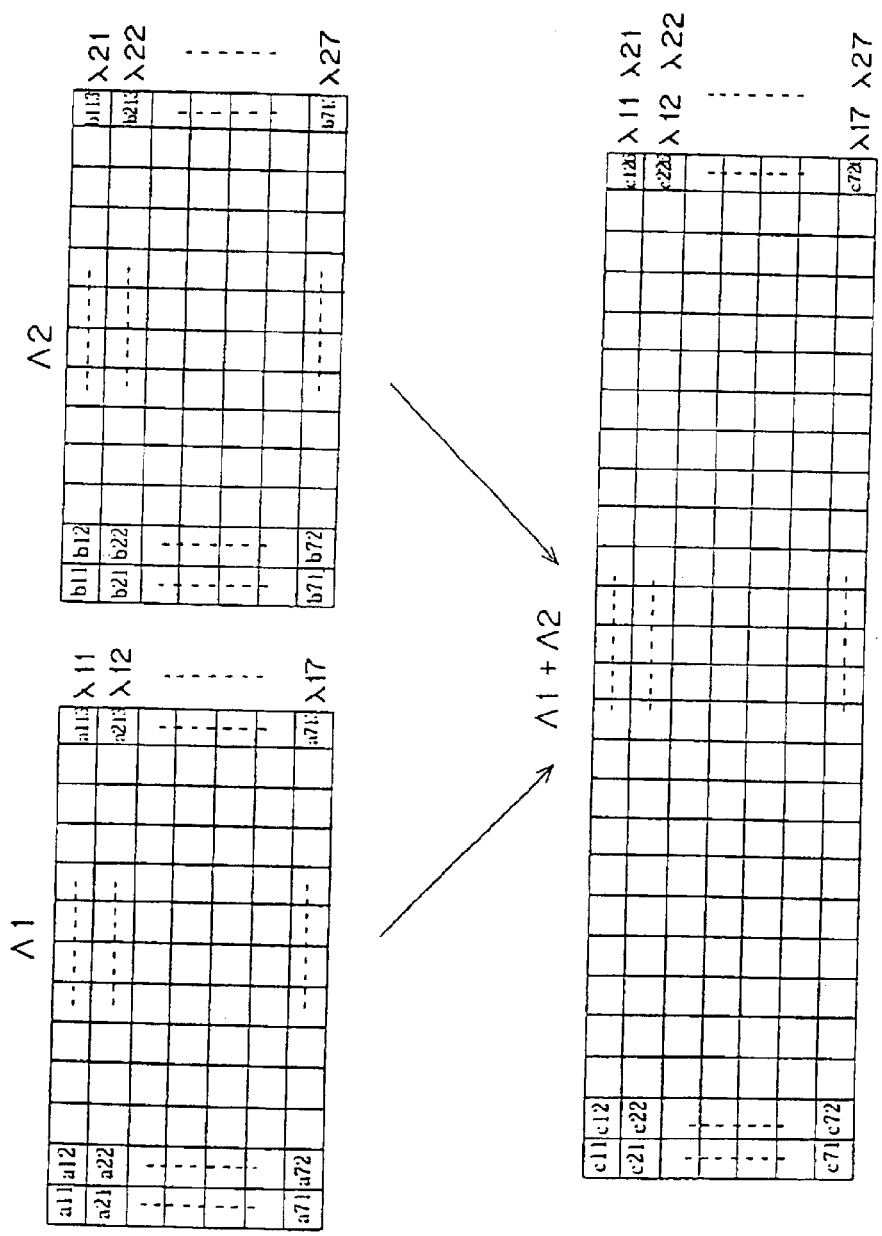
FIG. 10 shows the composition of the feature amount.

For example, if m=7 and n=13, the feature amounts $\Lambda 1$, $\Lambda 2$ and $\Lambda 1 + \Lambda 2$ are as shown in FIG. 10. In FIG. 10, the direction code histogram series $\lambda 1i$ (i=1, 2, ..., 7) of $\Lambda 1$ consists of 13 pieces of four-value vector aij (j=1, 2, ..., 13), and the direction code histogram series $\lambda 2i$ (i=1, 2, ..., 7) of $\Lambda 2$ consists of 13 pieces of four-value vector bij (j=1, 2, ..., 13).

$\Lambda 1 + \Lambda 2$ is generated by horizontally arranging $\Lambda 1$ and $\Lambda 2$ as they are, and its direction code histogram series $\lambda 1i \lambda 2i$ (i=1, 2, ..., 7) consists of 26 pieces of four-value vector cij (j=1, 2, ..., 26). ci1 to ci13 match ai1 to ai13, and ci14 to ci26 match bi1 to bi13. In other words, in the case of j =1, 2, ..., 13, cij=aij, and in the case of j=14, 15 , ..., 26, cij=bi(j−13).

Next, the process of the feature collating unit 12 is described with reference to FIGS. 11 to 13. FIG. 11 is a flowchart showing the processes of both the feature collating unit 12 and the feature generating unit 13. It is assumed here that the word list 14 referred to contains S pieces of words, from the 0th to the (S−1)-th.

First, the feature collating unit 12 sets a control variable i to its initial value of 0 (step S11), and compares i with the total number S of words contained in the word list 14 (step S12). If i is smaller than S, the unit 12 requests the feature generating unit 13 to generate the feature amount of the i-th word.

Upon receiving this request, the feature generating unit 13 accesses the word list 14 (step S13), and generates the feature amount of the i-th word from the feature amounts of the individual character dictionary by performing the above-mentioned process (step S14). Then, the unit 13 outputs the generated feature amount of the word to the feature collating unit 12.

Then, the feature collating unit 12 collates the feature amount of the image inputted from the feature extracting unit 11 with the feature amount of the i-th word inputted from the feature collating unit 12 in a memory, and calculates a distance (degree of similarity) between the two feature amounts (step S15).

Then, the feature collating unit 12 releases the memory area storing the feature amount of the i-th word (step S16), increments i by one (step S17), and repeats the processes in and after step S12. Since the memory area is cleared in step S16, the feature amount of the (i+1)-th word can be written there, and thereby memory space can be saved. When in step S12, i reaches S, the unit 12 terminates the process.

In step S15, in order to absorb the horizontal shift and deformation of characters, the feature collating unit 12 performs the following distance calculation. First, it is assumed that the feature amount of an input image is $N=(\upsilon 1, \upsilon 2, \ldots, \upsilon m)$ and the feature amount of a word to be compared is $\Lambda=(\lambda 1, \lambda 2, \ldots, \lambda m)$, provided however, that $\upsilon i$ and $\lambda i$ (i=1, 2, ..., m) are the direction code histogram series as shown in FIG. 9. At this time, the distance D (N, $\Lambda$) between two feature amounts N and $\Lambda$ is expressed as follows.

$$D(N, \Lambda) = \Sigma D(\upsilon i, \lambda i) \quad (1)$$

where $\Sigma D\ (\upsilon i, \lambda i)$ is the sum of the distance $D\ (\upsilon i, \lambda i)$ between two direction code histogram series $\upsilon i$ and $\lambda i$, with respect to it.

A direction code histogram series is a four-value vector series as described above. If the direction code histogram is decomposed into vector elements, it can be considered to be four numerical series. If the j-th numerical series of the direction code histogram series $\upsilon i$ is assumed to be $\upsilon i(j)$ (j=1, 2, 3 and 4), they are expressed as follow.

$$\upsilon i=(\upsilon i(1),\ \upsilon i(2),\ \upsilon i(3),\ \upsilon i(4)),$$

$$\lambda i=(\lambda i(1),\ \lambda i(2),\ \lambda i(3),\ \lambda i(4)) \quad (2)$$

At this time, $D\ (\upsilon i, \lambda i)$ is expressed as follows.

$$D(\upsilon i,\ \lambda i)=\Sigma D(\upsilon i(j),\ \lambda i(j)) \quad (3)$$

where $\Sigma D\ (\upsilon i(j), \lambda i(j))$ is the sum of the distance $D\ (\upsilon i(j), \lambda i(j))$ between two numerical series $\upsilon i(j)$ and $\lambda i(j)$, with respect to j. The distance $D\ (\upsilon i(j), \lambda i(j))$ can be calculated using a DP.

DP matching is well known as a matching method for time series data, such as voice data, etc. When two sets of data are collated, the local features of data are focussed, and an evaluation function indicating the quality of the entire matching is defined. Here, the distance between two sets of data is calculated from the value of this evaluation function.

Figure 12:
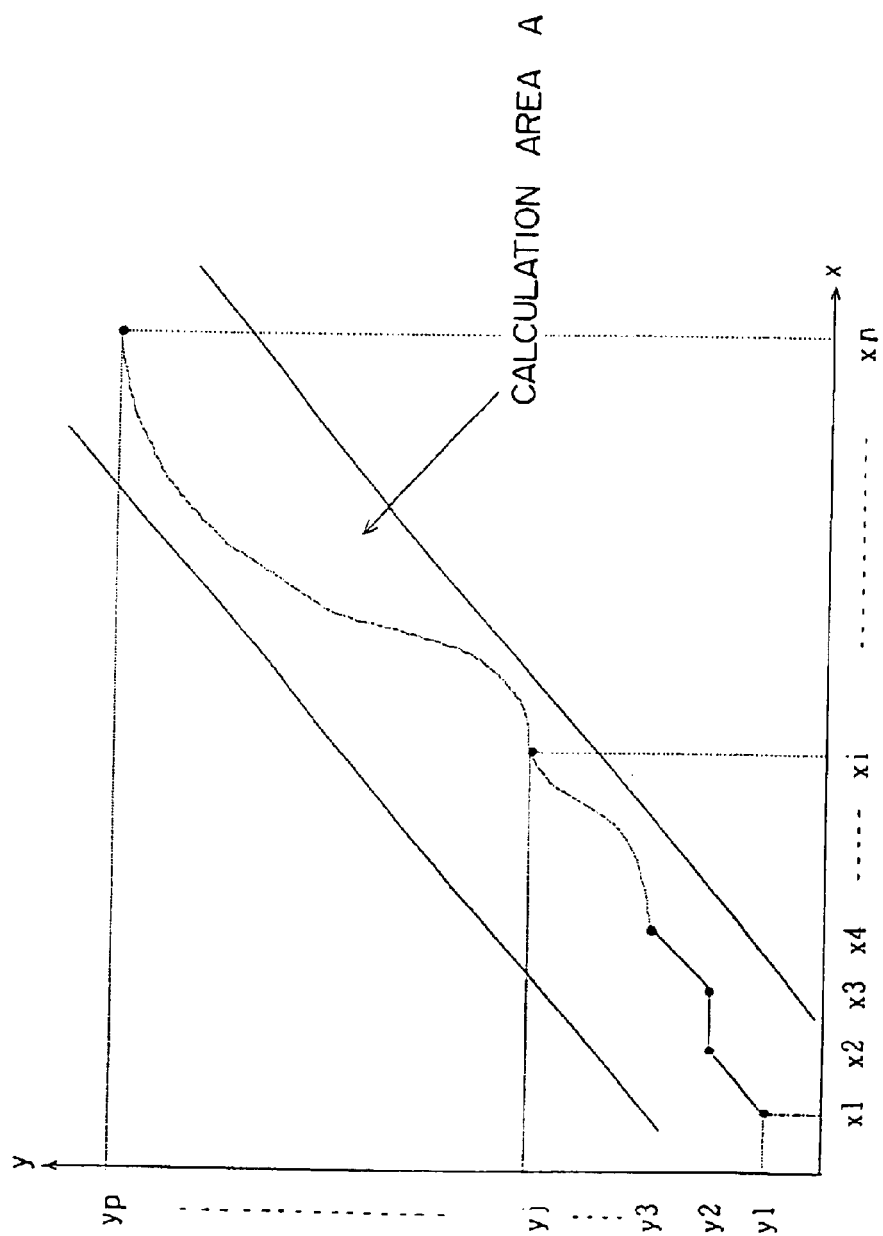
FIG. 12 shows DP matching.

FIG. 12 shows a DP matching method between a numerical series $\{x1, x2, \ldots, xn\}$ consisting of n numeric values and a numerical series $\{y1, y2, \ldots, yp)$ consisting of p numeric values.

Here, the numerical series $\{x1, x2, \ldots, xn\}$ and $\{y1, y2, \ldots, yp)$ are arranged on the x and y axes of a xy-coordinate plane, respectively, and the matching between the two numerical series are indicated by a plurality of dotted points on the plane. While an evaluation function g (xi, yj) is calculated in order, with a point (x1, y1) as a start point, according to a predetermined recurrence formula in a calculation area A, two points in the two different numerical series are matched. Then, the distance between the two numerical series can be obtained from g (xn, yn).

Figure 13:
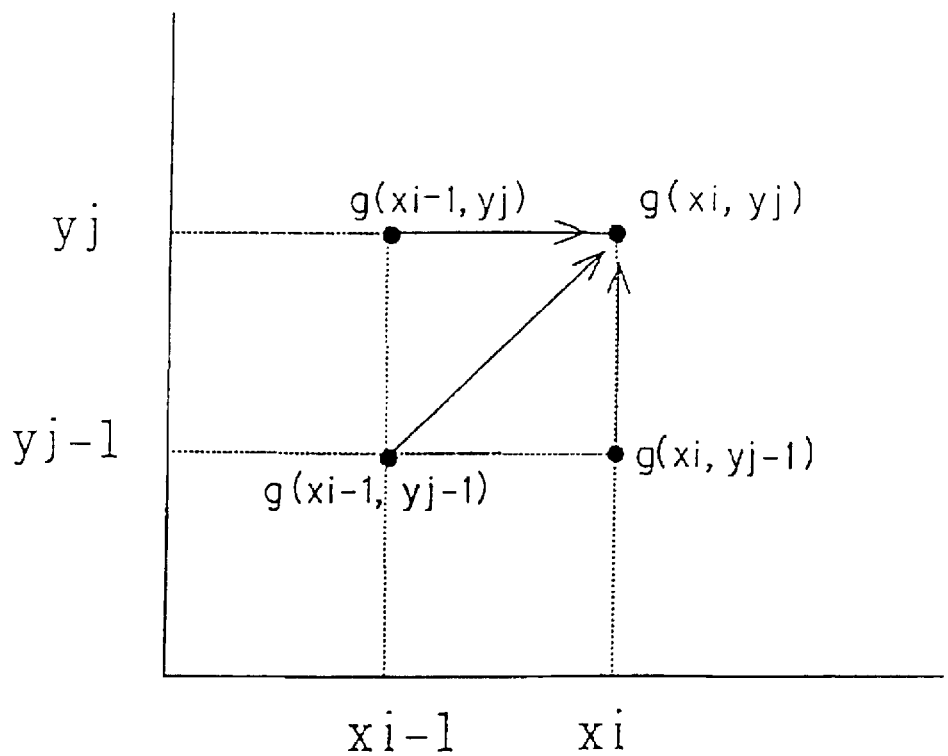
FIG. 13 shows a DP matching process.

FIG. 13 shows a calculation in which g (xi, yj) is obtained from g (xi−1, yj), g (xi−1, yj−1) and g (xi−1, yj−1) already obtained in the DP matching process. Here, for example, the following recurrence formula is used.

$$g(xi,\ yj)=\min\{g(xi-1,\ yj)+d(xi-1,\ yj),$$

$$g(xi-1,\ yj-1)+2*d(xi-1,\ yj-1),$$

$$g(xi,\ yj-1)+d(xi,\ yj-1)\} \quad (4)$$

where g(xi, yj) indicates the value of an evaluation function at the time of matching a partial numerical series $\{x1, x2, \ldots, xi\}$ with a partial numerical series $\{y1, y2, \ldots, yj\}$. d (xi, yj) indicates a distance at the time of matching a numeric value xi with a numeric value yj, which can be obtained by the following formula.

$$d(xi,\ yj)=|xi-yj| \quad (5)$$

min{ } indicates the minimum value of the three elements within { }. In this way, and with use of formula (4), only a matching between the partial numerical series $\{x1, x2, \ldots, xi\}$ and $\{y1, y2, \ldots, yj\}$ such that g (xi, yj) is minimized, is adopted and g (xi, yj) is stored.

By repeating such a calculation, the numerical series $\{x1, x2, \ldots, xn\}$ and $(y1, y2, \ldots, yp\}$ are matched, and g (xn, yp) can be obtained. Then, g (xn, yp)/(n+p) is designated as a distance between the two numerical series. The shorter the distance, the more similar the two numerical series; and the longer the distance, the more different the two numerical series.

In this way, if a distance $D\ (\upsilon i(j), \lambda i(j))$ is calculated using a DP matching method, a distance $D\ (N, \Lambda)$ between two feature amounts can be obtained using formulas (1) and (3).

In DP matching, the combination of two numerical values has flexibility, and two numerical series can be non-linearly matched. Using this flexibility, the horizontal shift of the features of an image can be somewhat absorbed. In this way, the feature amount in this embodiment can be used without a gradation process in the connecting direction of characters by replacing a conventional gradation process with DP matching in the distance calculation of feature amounts. For the distance calculation of the feature amounts, an arbitrary non-linear matching method for which the shift of features can be absorbed, can also be used in addition to DP matching.

Figure 14:
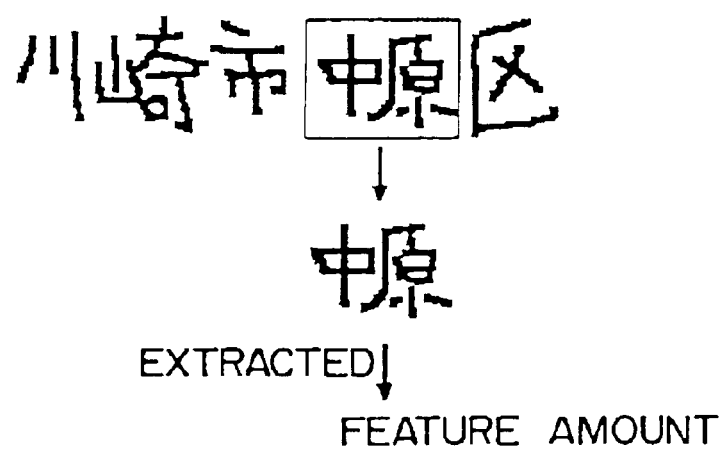
FIG. 14 shows an example of an image.

Next, its process flow is described using a concrete example of an input image. Here, a case where the recognizing process of a part of 川崎市 in a character string image shown in FIG. 14 is completed and a part of 中原 is inputted in succession, is studied. At this time, the feature amount is extracted from the input image of 川崎, and a feature collating process is executed according to the procedural flow shown in FIG. 15.

It is assumed that the words of 川崎, 幸, 中原, 高津, 宮前, 多摩 and 麻生 are registered in the word list 14 and the feature amount of all their characters are registered in the individual character dictionary 15.

First, the feature amount of 川 and 崎 are extracted from the individual character dictionary 15 according to the word list 14, and then the feature amount of 川崎 is composed (step S21). Then, the composed feature amount of 川崎 and the feature amount of the input image are collated, and a distance between the two feature amounts is stored (step S22). Then, the memory area for the feature amount of 川崎 is released (step S23).

Then, since 幸 is a one-character word, the feature amount of 幸 is extracted from the individual character dictionary 15 and is stored in the released memory area (step S24). Then, the feature amount of 幸 and the feature amount of the input image are collated, a distance between the two feature amounts is stored, and the memory area for the feature amount of 幸 is released (step S26).

Then, the feature amount of 中 and 原 are extracted from the individual character dictionary 15, and the feature amount of 中原 is composed in the released memory area (step S27). Then, the composed feature amount of 中原 and the feature amount of the input image are collated, a distance between the two feature amounts is stored (step S28), and the memory area of the feature amount of 中原 is released (step S29).

Such a collation process is executed for all the words contained in the word list 14. When this collation process is completed, those words are outputted as the recognition result in ascending order of distance.

Figure 15:
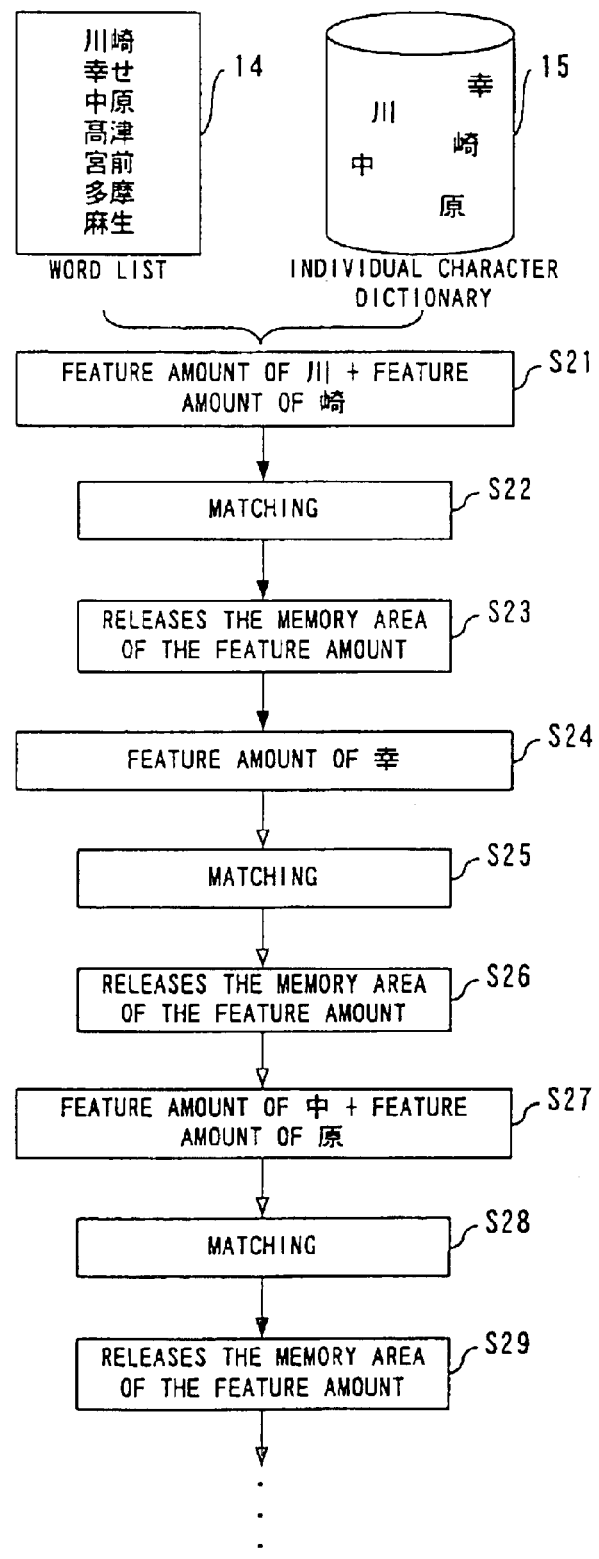
FIG. 15 shows an example of a feature collation process.

Although in FIGS. 14 and 15, the processing of words consisting of kanji is described, words including hiragana, katakana, alphanumerics, symbols, etc., are also processed in the same way. In addition to Japanese, the same process can be applied to the word recognition of an arbitrary language, such as Chinese, Korean, English, German, French, etc.

Furthermore, in addition to word recognition, the present invention can be applied to the recognizing process of pattern strings consisting of one or more individual patterns. In this case, lists with registered pattern string recognition candidates, are prepared instead of word lists, and a dictionary in which the feature amounts of individual patterns are registered is prepared instead of the individual character dictionary. Then, in the course of the recognition process of an image the feature amount of a pattern string is dynamically generated from the individual pattern dictionary, and the pattern string is collectively recognized.

Figure 16:
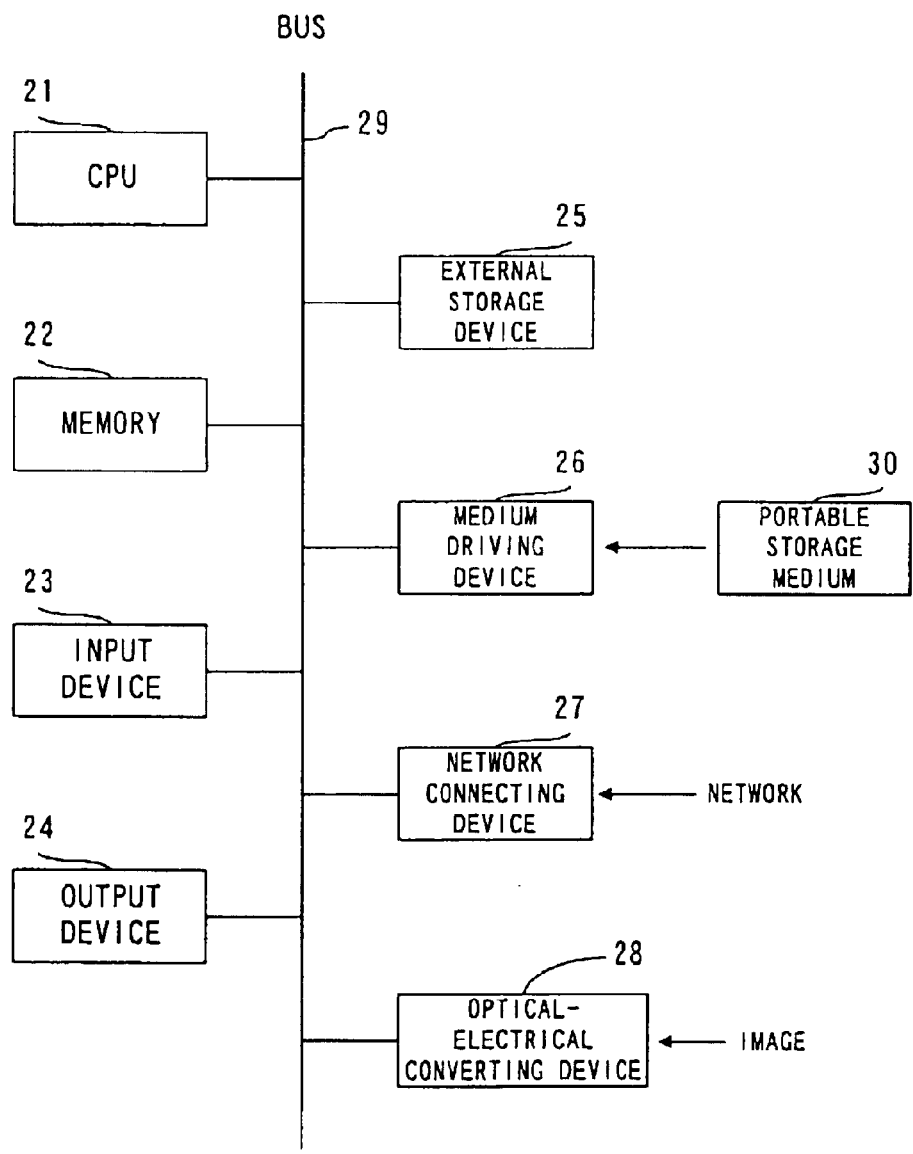
FIG. 16 shows the configuration of an information processing device.

The word recognizing apparatus shown in FIG. 2 can be configured using an information processing device (computer) shown in FIG. 16. The information processing device shown in FIG. 16 includes a CPU (central processing unit) 21, a memory 22, an input device 23, an output device 24, an external storage device 25, a medium driving device 26, a network connecting device 27 and an optical-electrical converting device 28, which are connected with each other using a bus 29.

The memory 22 includes, for example, a ROM (read only memory), a RAM (random access memory), etc., and stores programs and data to be used in the process. The CPU 21 executes necessary processes by running a program using the memory 22.

The feature extracting unit 11, feature collating unit 12 and feature generating unit 13 shown in FIG. 2 correspond to software components stored in the specific program code segments of the memory 22. Both the word list 14 and the individual character dictionary 15 are stored in a specific area of memory 22 as data.

The input device 23 corresponds to, for example, a keyboard, a pointing device, a touch panel, etc., and is used for the input of instructions and information from a user. The output device 24 includes, for example, a display, a printer, a speaker, etc., and is used for the output of inquiries and information to a user.

The external storage device 25 corresponds to, for example, a magnetic disk device, an optical disk device, a magneto-optical disk device, etc., and stores information. It is also possible for the above-mentioned programs and data to be stored in this external storage device and used by downloading them to the memory 22, if required.

The medium driving device 26 drives a portable storage medium 30, and accesses its recorded contents. For the portable storage medium 30, an arbitrary computer-readable storage medium, such as a memory card, a floppy disk, a CD-ROM (compact disk read only memory), an optical disk, a magneto-optical disk, etc., is used. It is also possible that the above-mentioned programs and data are stored in this portable storage medium 30 and are used by downloading them to the memory 22, if required.

The network connecting device 27 communicates with an external apparatus through an arbitrary network (line), such as a LAN (local area network), etc., and converts data during communication. If required, it is possible for the device 27 to receive the above-mentioned programs and data from the external apparatus and to use them by downloading them to the memory 22.

The optical-electrical converting device 28 corresponds to, for example, an image scanner, etc., and converts an image into digital data and inputs the data. The inputted image data are read into the memory 22, and the feature amount is extracted from the data.

Figure 17:
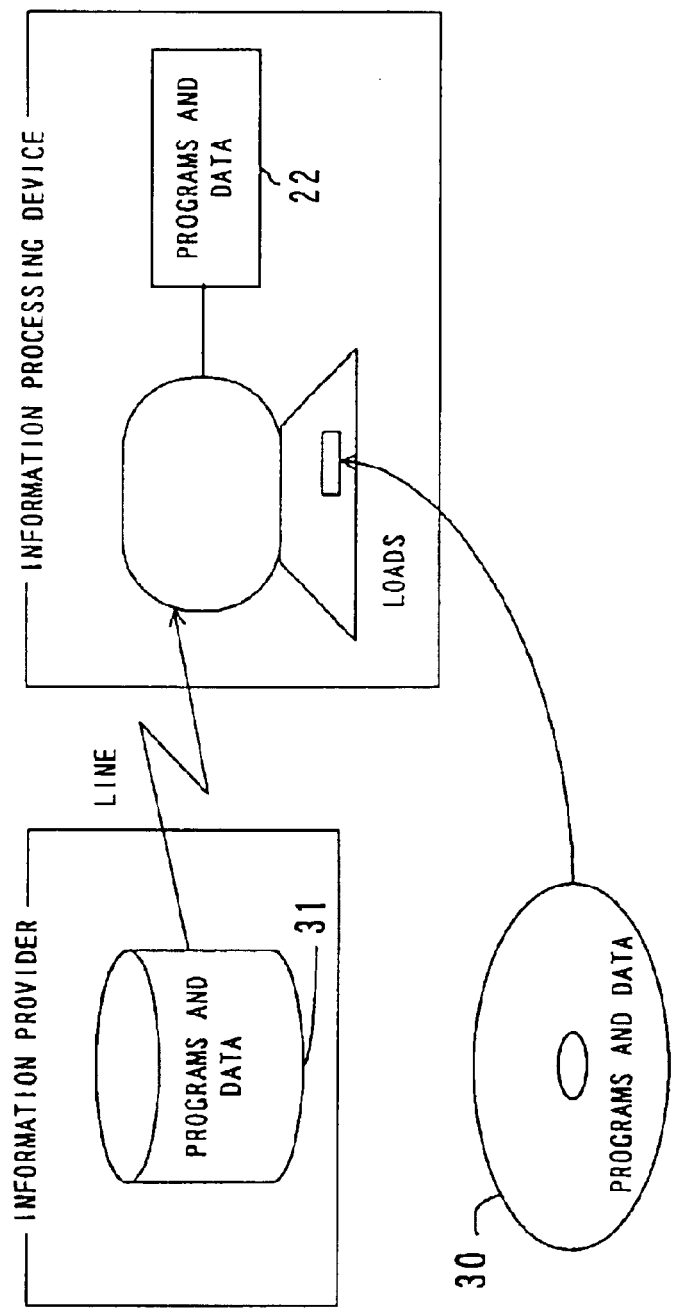
FIG. 17 shows storage media.

FIG. 17 shows computer-readable recording media which can provide the information processing device shown in FIG. 26 with programs and data. The programs and data stored in the portable storage medium 30 or an external database 31 can be stored in the memory 22. Then, the CPU 21 runs the programs using the data, and executes necessary processes.

According to the present invention, a word can be collectively recognized, without restricting the scope of words, by dynamically generating a word dictionary from an individual character dictionary. Accordingly, word recognition is available for arbitrary use.

Since the present invention adopts a non-linear matching method, such as DP matching, for the distance calculation of the feature amount and the method used to generate a mesh in the connecting direction of characters is made variable, and a certain degree of recognition accuracy is also maintained in word recognition.

What is claimed is:

1. A word recognizing apparatus, comprising:
   a listing unit storing a list of a candidate word comprising a plurality of characters;
   a dictionary unit storing feature amounts of the plurality of characters;
   an extracting unit extracting the feature amount from a recognition target by a process in which the recognition target is not required to be divided into units even if the recognition target comprises a plurality of units;
   a generating unit referring to the list of the candidate word stored in said listing unit, and dynamically generating the feature amount of only the candidate word registered in the list by a composition operation using the feature amounts of the plurality of characters stored in said dictionary unit during a recognition process for the recognition target, wherein the feature amount of only the candidate word and the plurality of characters and the composition operation are determined such that the feature amount of only the candidate word dynamically generated by the composition operation matches the feature amount extracted from the recognition target by said extracting unit;
   a collating unit collating the dynamically generated feature amount of only the candidate word with the feature amount extracted from the recognition target, and outputting a recognition result;
   an inputting unit inputting an image as the recognition target; and
   an extracting unit performing a one-dimensional gradating conversion in a direction perpendicular to a connecting direction of characters for a direction code histogram of a contour line in each of a plurality of small areas in an inputted image provided that no gradating conversion is performed in the connecting direction of the characters, and extracting a direction code histogram series obtained from a conversion result as the feature amount of the recognition target.

2. The word recognizing apparatus according to claim 1, wherein said extracting unit divides a length of the inputted image in the direction perpendicular to the connection direction of characters by a predetermined integer and divides the image into the small areas with an obtained quotient as a size of each of the small areas.

3. A word recognizing apparatus, comprising:
   a listing unit storing a list of a candidate word comprising a plurality of characters;
   a dictionary unit storing feature amounts of the plurality of characters;
   an extracting unit extracting the feature amount from a recognition target by a process in which the recognition target is not required to be divided into units even if the recognition target comprises a plurality of units;

a generating unit referring to the list of the candidate word stored in said listing unit, and dynamically generating the feature amount of only the candidate word registered in the list by a composition operation using the feature amounts of the plurality of characters stored in said dictionary unit during a recognition process for the recognition target, wherein the feature amount of only the candidate word and the plurality of characters and the composition operation are determined such that the feature amount of only the candidate word dynamically generated by the composition operation matches the feature amount extracted from the recognition target by said extracting unit; and a collating unit collating the dynamically generated feature amount of only the candidate word with the feature amount extracted from the recognition target, outputting a recognition result, performing a non-linear matching of the feature amount of the candidate word and the feature amount of the recognition target such that a shift of the recognition target in a connection direction of characters is absorbed, and calculating a degree of similarity between the feature amount of the candidate word and the feature amount of the recognition target.

4. The word recognizing apparatus according to claim 3, wherein said collating unit includes a memory storing the feature amount of the candidate word, and releases the memory when a collation of the feature amount of the candidate word is completed.

5. The word recognizing apparatus according to claim 3, wherein said generating unit generates a new direction code histogram series by arranging a plurality of direction code histogram series corresponding to the feature amounts of characters composing the candidate word and designates a generated direction code histogram series as the feature amount of the candidate word.

6. The word recognizing apparatus according to claim 3, wherein said listing unit stores a plurality of lists of candidate words, and wherein said generating unit selects a list which has a high possibility of containing a word corresponding to the recognition target from among the plurality of lists according to a previous recognition result and refers to the selected list.

7. A word recognizing apparatus, comprising:

a listing unit storing a list of a candidate word comprising a plurality of characters;

an extracting unit extracting a feature amount from a recognition target by a process in which a recognition target is not required to be divided into units even if the recognition target comprises a plurality of units;

a generating unit referring to a list of a recognition candidate word, and dynamically generating the feature amount of only the recognition candidate word registered in the list by a composition operation using feature amounts of the plurality of characters during a recognition process for the recognition target, the feature amounts of the candidate word and the plurality of characters and the composition operation determined such that the feature amount of only the recognition candidate word generated by the composition operation matches the feature amount extracted from the recognition target by said extracting unit; and a collating unit collating the generated feature amount of only the recognition candidate word with the feature amount extracted from the recognition target, outputting a recognition result, performing a non-linear matching of the feature amount of the candidate word and the feature amount of the recognition target such that a shift of the recognition target in a connection direction of characters is absorbed, and calculating a degree of similarity between the feature amount of the candidate word and the feature amount of the recognition target.

8. A recognizing apparatus, comprising:

a listing unit storing a list of a candidate word comprising a plurality of characters;

an extracting unit extracting a feature amount from a recognition target by a process in which the recognition target is not required to be divided into units even if the recognition target comprises a plurality of units;

a generating unit referring to a list of a recognition candidate pattern string, and dynamically generating the feature amount of only the recognition candidate pattern string registered in the list by a composition operation using feature amounts of patterns during a recognition process for the recognition target, wherein the feature amounts of the candidate word and the plurality of characters and the composition operation are determined such that the feature amount of only a recognition candidate word generated by the composition operation matches the feature amount extracted from the recognition target by said extracting unit; and a collating unit collating the generated feature amount of the recognition candidate pattern string with the feature amount extracted from the recognition target, outputting a recognition result, performing a non-linear matching of the feature amount of the candidate word and the feature amount of the recognition target such that a shift of the recognition target in a connection direction of characters is absorbed, and calculating a degree of similarity between the feature amount of the candidate word and the feature amount of the recognition target.

9. A computer-readable storage medium on which is recorded a program causing a computer to execute a process, said process comprising:

storing a list of a candidate word comprising a plurality of characters;

extracting a feature amount from a recognition target by a process in which the recognition target is not required to be divided into units even if the recognition target comprises a plurality of units;

dynamically generating, by referring to a list of a recognition candidate word, the feature amount of only the recognition candidate word registered in the list by a composition operation using feature amounts of the plurality of characters during a recognition process for the recognition target, wherein the feature amounts of the candidate word and the plurality of characters and the composition operation are determined such that the feature amount of the recognition candidate word dynamically generated by the composition operation matches the feature amount extracted from the recognition target by said extracting;

collating the generated feature amount of the recognition candidate word with the feature amount extracted from the recognition target;

performing a non-linear matching of the feature amount of the candidate word and the feature amount of the recognition target such that a shift of the recognition target in a connection direction of characters is absorbed; and calculating a degree of similarity between the feature amount of the candidate word and the feature amount of the recognition target.

10. A computer-readable storage medium on which is recorded a program causing a computer to execute a process, said process comprising:

storing a list of a candidate word comprising a plurality of characters;

extracting a feature amount from a recognition target by a process in which the recognition target is not required to be divided into units even if the recognition target comprises a plurality of units;

dynamically generating, by referring to a list of a recognition candidate pattern string, the feature amount of only the recognition candidate pattern string registered in the list by a composition operation using feature amounts of patterns during a recognition process for the recognition target, wherein the feature amounts of the candidate word and the plurality of characters and the composition operation are determined such that the feature amount of only a recognition candidate word generated by the composition operation matches the feature amount extracted from the recognition target by said extracting;

collating the generated feature amount of the recognition candidate pattern string with the feature amount extracted from the recognition target;

performing a non-linear matching of the feature amount of the candidate word and the feature amount of the recognition target such that a shift of the recognition target in a connection direction of characters is absorbed; and calculating a degree of similarity between the feature amount of the candidate word and the feature amount of the recognition target.

11. A recognizing method, comprising:

generating a list of a candidate pattern string comprising a plurality of characters;

generating a dictionary storing feature amounts of a plurality of patterns;

extracting the feature amount from a recognition target by a process in which the recognition target is not required to be divided into units even if the recognition target comprises a plurality of units;

dynamically generating, by referring to the list of the candidate pattern string, the feature amount of only the candidate pattern string registered in said list by a composition operation using the feature amounts of patterns stored in said dictionary during a recognition process for the recognition target, wherein the plurality of characters and the composition operation and the feature amount of the candidate pattern are determined such that the feature amount of only the candidate pattern string generated by the composition operation matches a feature amount extracted from the recognition target by said extracting;

collating the generated feature amount of the candidate pattern string with the feature amount extracted from the recognition target;

performing a non-linear matching of the feature amount of the candidate pattern string and the feature amount of the recognition target such that a shift of the recognition target in a connection direction of characters is absorbed; and calculating a degree of similarity between the feature amount of the candidate pattern string and the feature amount of the recognition target.

12. A word recognizing apparatus, comprising:

a listing unit storing a list of a candidate word;

a dictionary unit storing feature amounts of a plurality of characters;

an extracting unit dividing a recognition target in units of meshes and extracting the feature amount from the divided recognition target, wherein a number of the meshes changes according to a length of the recognition target when the recognition target comprises the plurality of characters;

a generating unit referring to the list of the candidate word stored in said listing unit, and dynamically generating the feature amount of only the candidate word registered in the list by a composition operation using the feature amounts of the plurality of characters stored in said dictionary unit during a recognition process for the recognition target, wherein the feature amounts of the candidate word and the plurality of characters and the composition operation determined such that the feature amount of the candidate word generated by the composition operation matches the feature amount extracted from the recognition target by said extracting unit; and a collating unit collating the generated feature amount of the candidate word with the feature amount extracted from the recognition target, outputting a recognition result, performing a non-linear matching of the feature amount of the candidate word and the feature amount of the recognition target such that a shift of the recognition target in a connection direction of characters is absorbed, and calculating a degree of similarity between the feature amount of the candidate word and the feature amount of the recognition target.

* * * * *

UNITED STATES PATENT AND TRADEMARK OFFICE
CERTIFICATE OF CORRECTION

PATENT NO. : 6,859,556 B2  
APPLICATION NO. : 09/309894  
DATED : February 22, 2005  
INVENTOR(S) : Hiroaki Takebe et al.

It is certified that error appears in the above-identified patent and that said Letters Patent is hereby corrected as shown below:

Title Page      [56] References Cited, add:

OTHER PUBLICATIONS  
S. Tsuruoka et al., "Handwritten "Kanji" and "Hiragana" Character Recognition Using Weighted Direction Index Histogram Method", The Transaction of the Institute of Electronics, Information and Communication Engineers, D. Vol. J70-D, No. 7, The Institute of Electronics, Information and Communication Engineers, July 1987, Partial Translation p. 1391-p. 1393 2.1-2.3

Signed and Sealed this

Twenty-third Day of January, 2007

JON W. DUDAS  
*Director of the United States Patent and Trademark Office*